(12) United States Patent
Raffle et al.

(10) Patent No.: US 7,747,352 B2
(45) Date of Patent: Jun. 29, 2010

(54) PHYSICAL MODELING SYSTEM FOR CONSTRUCTING AND CONTROLLING ARTICULATED FORMS WITH MOTORIZED JOINTS

(75) Inventors: Hayes Solos Raffle, Cambridge, MA (US); Amanda Jane Parkes, Cambridge, MA (US); Hiroshi Ishii, Boston, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 1103 days.

(21) Appl. No.: 11/107,120

(22) Filed: Apr. 15, 2005

(65) Prior Publication Data

US 2006/0100739 A1 May 11, 2006

Related U.S. Application Data

(60) Provisional application No. 60/563,756, filed on Apr. 20, 2004.

(51) Int. Cl.
*B25J 9/18* (2006.01)
*G05B 19/19* (2006.01)

(52) U.S. Cl. ............... 700/253; 700/245; 700/263; 318/568.11; 318/568.12; 318/568.1; 318/560; 446/91; 446/85; 901/14; 901/23

(58) Field of Classification Search ............. 700/245, 700/248; 446/85, 91; 318/568.1, 568.12; 901/1
See application file for complete search history.

(56) References Cited

U.S. PATENT DOCUMENTS 3,822,569 A * 7/1974 Lautrup-Larsen ............ 446/85
5,103,403 A * 4/1992 Ch'Hayder et al. ......... 700/263
5,523,662 A * 6/1996 Goldenberg et al. ... 318/568.11
5,672,924 A * 9/1997 Wallace et al. ............. 310/152
6,084,373 A * 7/2000 Goldenberg et al. ... 318/568.11
6,411,055 B1 * 6/2002 Fujita et al. ............ 318/568.12
6,454,624 B1 * 9/2002 Duff et al. ..................... 446/91
6,603,281 B2 * 8/2003 Yim et al. .................... 318/560
6,636,781 B1 * 10/2003 Shen et al. ................... 700/248
6,686,717 B2 * 2/2004 Khairallah ............. 318/568.11
2002/0190682 A1 * 12/2002 Schempf et al. ........ 318/568.11
2005/0072260 A1 * 4/2005 Ananiev et al. ........... 74/490.01

FOREIGN PATENT DOCUMENTS

WO    WO 0151259 A2 *   7/2001

OTHER PUBLICATIONS

Phile Frei, Victor Su, Bakhtiar Mikhak, Hiroshi Ishii, "curlybot: Designing a New Class of Computational Toys" CHI 2000, Apr. 1-6, 2000, CHI letters, vol. 2 Issue 1 pp. 129-136.*

* cited by examiner

*Primary Examiner*—Thomas G Black
*Assistant Examiner*—Lin B Olsen
(74) *Attorney, Agent, or Firm*—Charles G. Call

(57) ABSTRACT

A "construction set" consisting of active and passive parts connected by joints that can be manipulated to form an movable articulated assembly representing things like animals and skeletons. Each active part includes a position sensor for acquiring and storing position data specifying a sequence of positions assumed by the active part as the assembly is reshaped, and a controllable drive motor for moving the active part relative to a connected part in accordance with the position data.

27 Claims, 7 Drawing Sheets

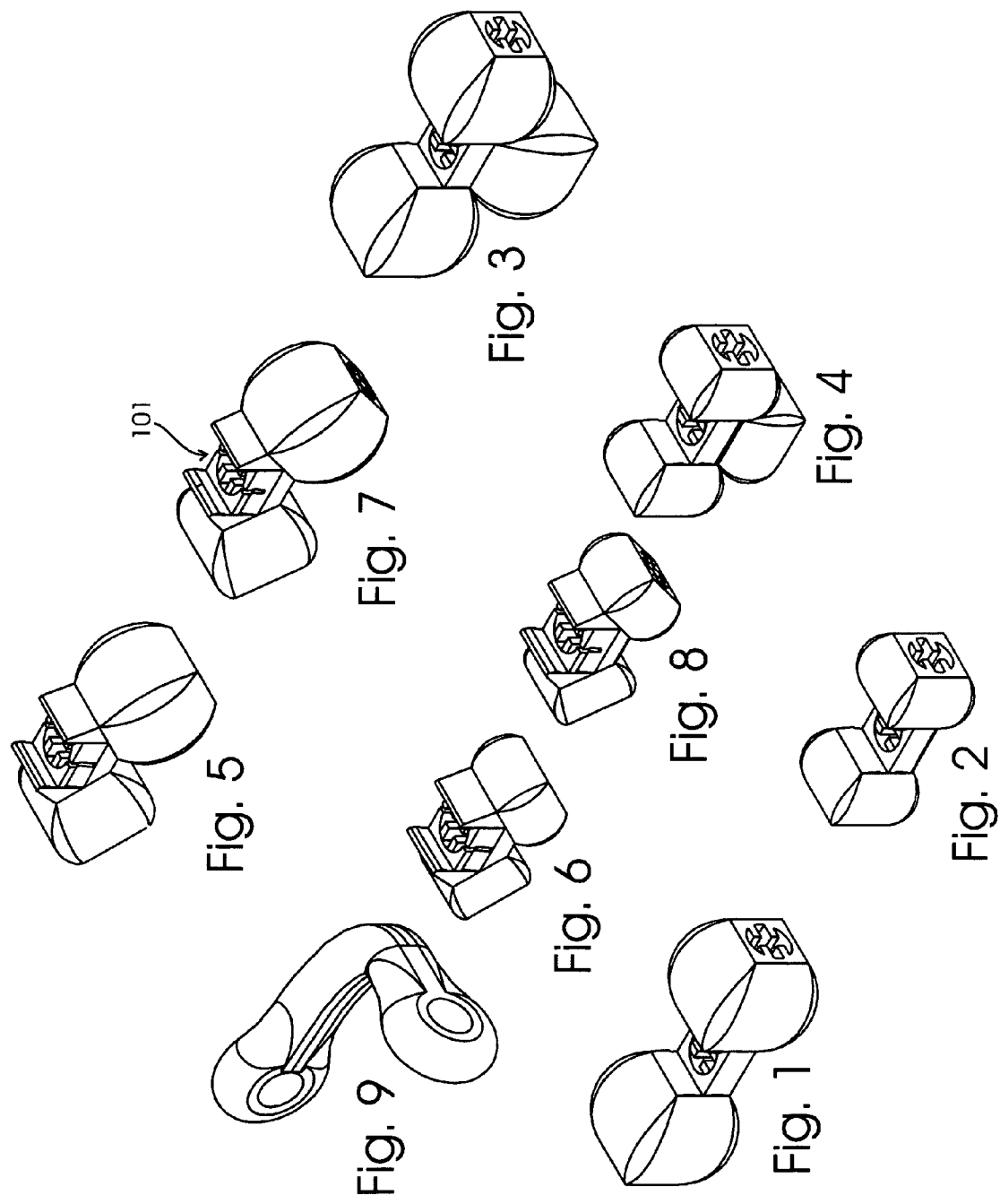

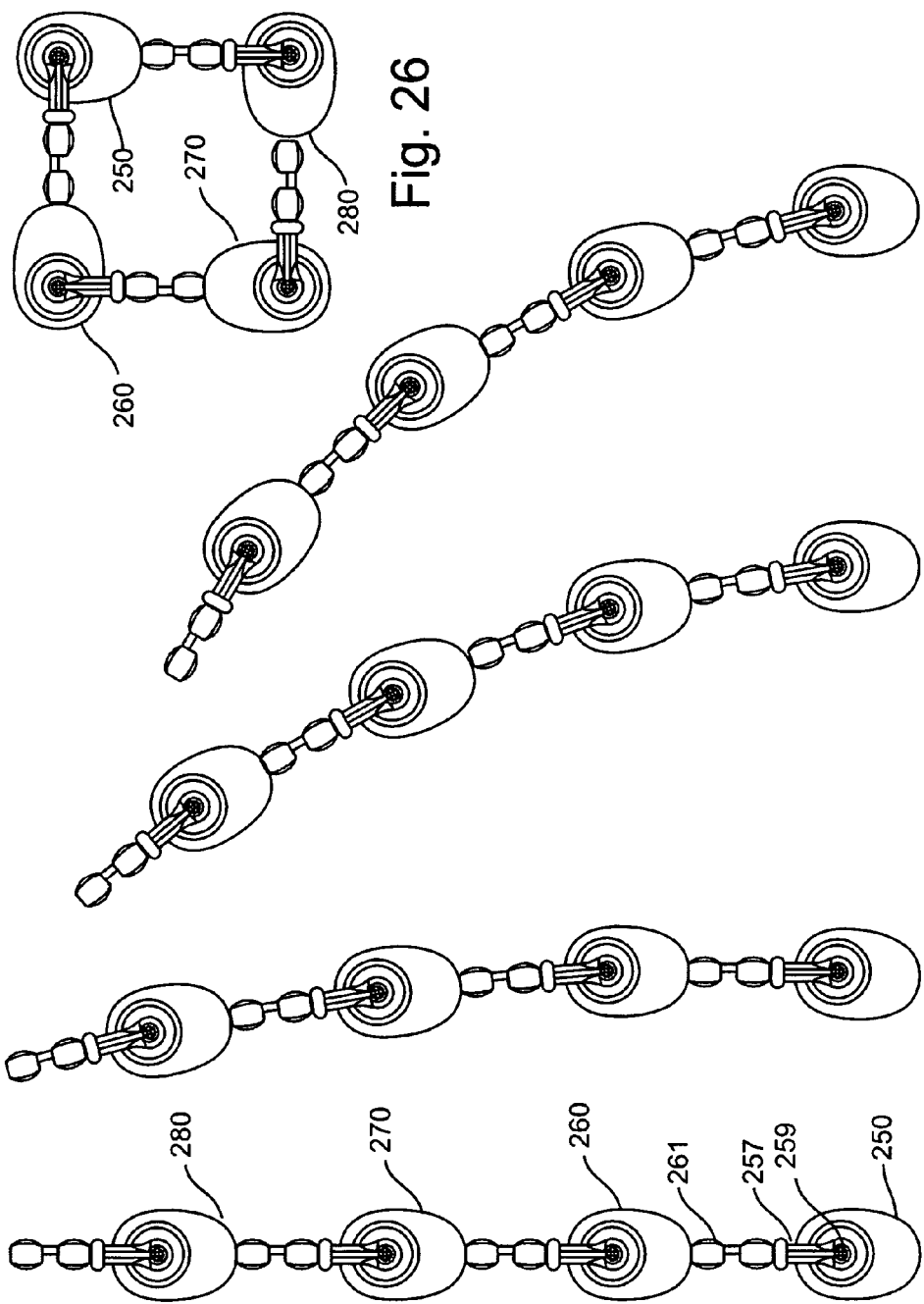

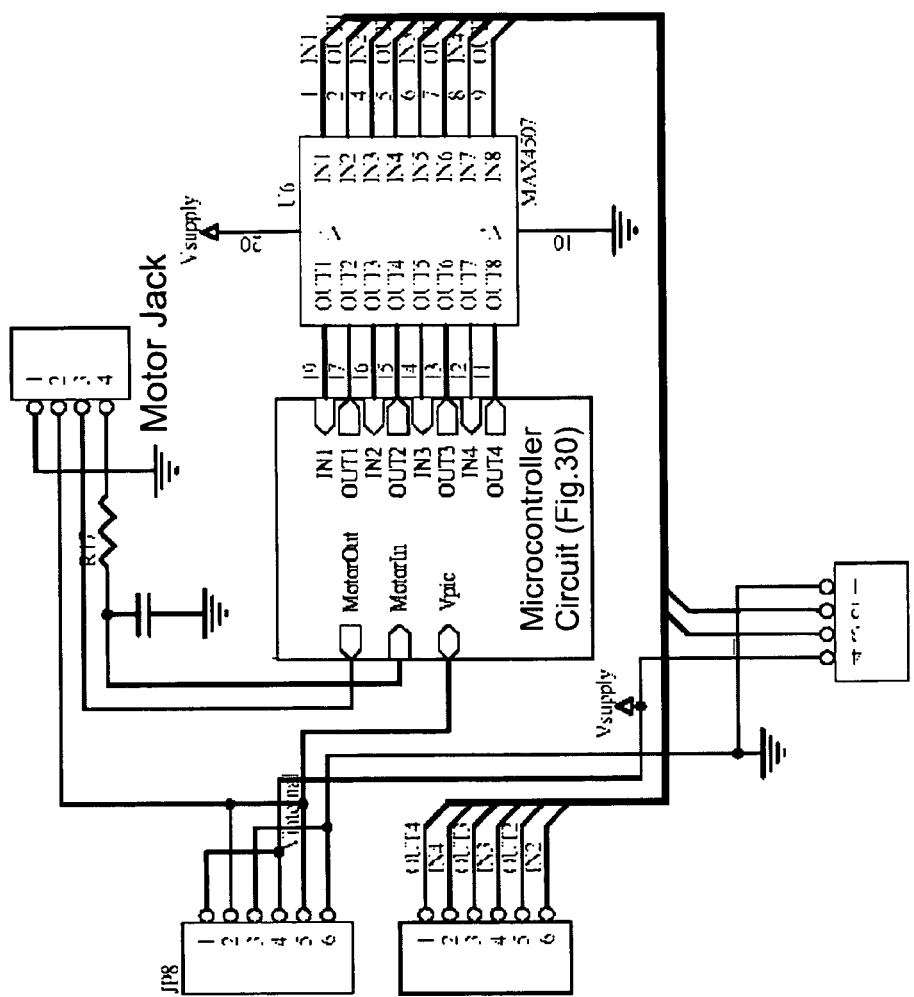
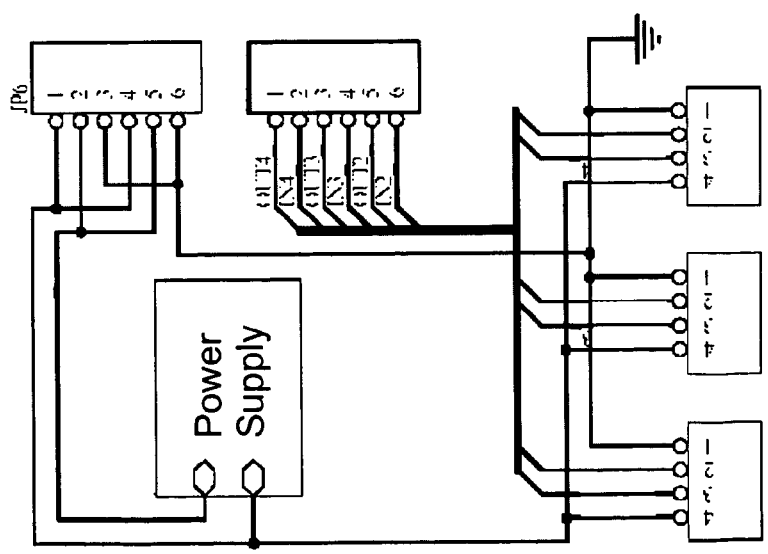
Fig. 29

PHYSICAL MODELING SYSTEM FOR CONSTRUCTING AND CONTROLLING ARTICULATED FORMS WITH MOTORIZED JOINTS

CROSS REFERENCE TO RELATED APPLICATIONS

This application is a Non-Provisional of U.S. Patent Application Ser. No. 60/563,756 filed on Apr. 20, 2004, the disclosure of which is hereby incorporated herein by reference.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

REFERENCE TO COMPUTER PROGRAM LISTING APPENDIX

A computer program listing appendix is stored on each of two duplicate compact disks which accompany this specification. Each disk contains computer program listings which illustrate implementations of the invention. The listings are recorded as ASCII text in IBM PC/MS DOS compatible files which have the names, sizes (in kilobytes) and creation dates listed below:

| FILENAME | SIZE | CREATED |
| --- | --- | --- |
| 18F252B.H.txt | 9 kb | Feb. 16, 2005 |
| Topobo.c.txt | 99 kb | Feb. 16, 2005 |

FIELD OF THE INVENTION

This invention relates to modular construction assemblies.

SUMMARY OF THE INVENTION AND COMPARISON WITH PRIOR SYSTEMS

The present invention is a "construction set" consisting of active and passive components that a child or adult can snap together to assemble things that move, like animals and skeletons. We call the preferred embodiment of the invention "Topobo."

Imagine Tinkertoys®. Imagine that all the joints are manipulable and there are servo motors connected to each joint. The joints (servo motors) have memory and when the user moves them they can playback the motion. The joints can communicate with one another, exchanging data and commands with other servo motors or with a personal computer. Many different things can be built with the system and input and control their motions, and the system can move in response.

Topobo consists of both active and passive parts that can mechanically connect together. "Active" parts can move, and each active part is equipped with its own servomotor, CPU, memory, communication means, an LED and a button. "Passive" parts do not move but can be interconnected with either active or passive parts to form articulated structures based on crystal geometries that can take many different shapes.

A Topobo structure can operate autonomously, or can be used as a peripheral input/output device connected to a computer.

Autonomous use: First the user builds a creation with Actives and/or Passives. Then the user presses a button one of the Actives and manipulate the user's creation. The system records the user's motions. When the user presses a button again, the system replays the user's motions repeatedly. Pressing the button a third time makes the creation stop moving. For example, the user can make a dog and teach it to take two steps. It will then walk repeatedly.

Backpack: The backpack is a special part equipped with a sensor, such as a manually adjustable control knob, that snaps onto an Active part and can change its motion. For example, an "amplitude" backpack can scale the motion of ajoint, making it smaller or larger.

Queen: The Queen is a special Active that controls all of the other Actives. For Example, a "copy" queen makes all other Actives synchronously copy its motions.

PC Peripheral: Imagine a building toy where a computer automatically knows what the user has built and can change the shape of the user's creation based on rules the user has defined. For instance, the user might build a vase out of Topobo and then, using a graphical interface on the PC, constrain its volume to 10 gallons. The user can then physically manipulate the user's Topobo model and the PC will maintain the physical model's volume at 10 gallons. In this example, if the user pushes in one side of the physical model of the vase, the PC will make the other sides expand to keep the volume constant.

Using Topobo, it's much easier to program motions, compared to systems like LEGO® Mindstorms® (a product of the Lego Group, Denmark, described at www.legomindstorms.com), which use a central programmed computer to control motor movement. Topobo uses peer-to-peer networking and distributed sensing and control, making it easily scalable. Synchronous I/O functions allow the user to overwrite position data during playback. The backpack allows the user to edit motions during record or playback and allows the user to physically add motion modifiers by adding a physical component to the system. The physical geometry of the passives, coupled with the Actives, allows the creation of many types of dynamic structures. The Queen allows an individual Active to control an entire network. Topobo can run without a control computer (PC).

While many types of interfaces exist for inputting information to a computer, few offer physical affordances inherent to materials like clay or blocks. A mouse is allows a user to input one instruction at one time. Systems like "Illuminating Clay" described in U.S. patent application Ser. No. 10/825,701 filed Apr. 16, 2004 entitled "A three dimensional tangible interface for interacting with spatial-temporal data using a laser scanner" filed by Benjamin Piper, Carlo Ratti and Hiroshi Ishii and "Sandscape" described in U.S. patent application Ser. No. 10/825,702 filed Apr. 16, 2004, published as Patent Application Publication No. 20050013477, entitled "A three dimensional tangible interface for interacting with spatial-temporal data using infrared light sources and infrared detectors" by Yao Wang, Assaf Biderman, Carlo Ratti, Benjamin Piper and Hiroshi Ishii, allow the user to manipulate physical objects made of deformable materials like clay or sand, but does not allow the computer to change the physical interface. Topobo aims to provide a physical sculpting medium that is bi-directional: a user can manipulate a form, and a computer can give computational feedback by manipulating the form. Thus, the action of the user performs manipulations in the same physical space as the computer output. Topobo achieves this by embedding computation, sensing and actuation in the physical medium/interface. Illuminating Clay and Sandscape use inert clay and sand respectively as the interface and external sensors/projectors to create an illusion of coincident input/output space for the user.

The Actuated Workbench (see *The Actuated Workbench: Computer-Controlled Actuation in Tabletop Tangible Interfaces*, by Gian Pangaro, Dan Maynes-Aminzade, and Hiroshi Ishii, Symposium on User Interface Software and Technology, Paris, France, October, 2002) addresses this same issue by physically manipulating the input devices (physical pucks on a table top) to express computational output. However, the Actuated Workbench is 2-dimensional. Topobo extends this idea to the creation and manipulation of a 3-dimensional form.

The Feelex system is described in *Project FEELEX: adding haptic surface to graphics*, International Conference on Computer Graphics and Interactive Techniques, Proceedings of the 28th annual conference on Computer graphics and interactive techniques, 2001 ISBN: 1-58113-374-X. That system allows a user to manipulate a 2-dimensional membrane that behaves as a sort of "actuated pinscreen" that can change the height of the membrane at discreet points on the surface of the membrane. This allows some manipulation of a 2-dimensional surface in to 3-dimensional space. Topobo improves on this system in several ways:

Topobo is scalable, and can become various physical sizes or shapes.

Topobo can be used to represent a closed object, rather than just a surface contour, and thus can represent "undercuts" and complex surfaces that a system like Feelex can not represent.

While the Feelex system gives computational feedback in the form of visual and physical change, it appears to be primarily intended as a mechanism for enhancing video projections with the aid of a flexible projection surface. Topobo is intended to address the physical sculpting and manipulation of form rather than to enhance a projected image.

Curlybot, an autonomous two-wheeled vehicle with embedded electronics that can record how it has been moved on any flat surface and then play back that motion accurately and repeatedly, is described in *curlybot: Designing a New Class of Computational Toys* by Phil Frei, Victor Su, Bakhtiar Mikhak, and Hiroshi IshiiCHI, 2000 Conference on Human Factors in Computing Systems (April 2000). Curlybot uses a one-button interface with complex 3D motion, and the immediacy of the interface design encourages rapid experimentation with motion. Physical programming by example also results in natural looking, emotionally engaging motions because they are the reflection of the user's own body movements.

The Modular Robotics group at PARC has created a hardware system that is most similar to Topobo in that it provides distributed power, actuation, sensing and computation in a modular system. The PARC "Posable Programming" system is described in U.S. Pat. No. 6,454,624 issued to Duff et al. on Sep. 24, 2002 entitled "Robotic toy with posable joints," and in U.S. Pat. No. 6,605,914 issued on Aug. 12, 2003 to Yim et al. Topobo provides several improvements over the PARC system:

Topobo provides the "backpack" to introduce spatial algorithms and peer-to-peer communications algorithms that allow a user to control many parts by moving only one part in conjunction with a rule.

Topobo allows physical editing of motions using "backpack" interfaces while the interface is moving dynamically.

Topobo allows computational constraints to affect the forms a physical system may take.

Topobo uses a combination of active components and specially shaped passive components which that permit the user to build rigid structures having cubic and hexagonal crystalline geometries that be joined by movable motorized joints.

Topobo adds physical programmability to a modular programmable robot building system like LEGO® Mindstorms®. Topobo has distributed computation that allows the creation of unique spatial algorithms and multiple parallel processing of data.

Topobo is a 3-dimensional construction set using active modules embedded with kinetic memory and the ability to record and playback physical motion. Unique among modeling systems is Topobo's coincident physical input and output behaviors. By snapping together a combination of Passive (static) and Active (motorized) Topobo components, people can quickly assemble dynamic biomorphic forms like animals and skeletons, animate those forms by pushing, pulling, and twisting them, and observe the system repeatedly play back those motions. For example, a dog can be constructed and then taught to gesture and walk by twisting its body and legs. The dog will then repeat those movements and walk repeatedly.

Topobo is also designed to be used as a peripheral to a PC. Used in this way, Topobo can be a physical tool to create and manipulate 3D models. In prior systems, 3D computer models are currently represented using screen-based graphics, such as surface meshes represented in a simulated 3-axis coordinate system. These models are traditionally created using a keyboard and mouse. Topobo is designed to be a modular building system to physically construct and input 3D computer models. The computer can then change the morphology of the physical model by controlling its embedded motors. Thus, Topobo becomes an input and output device for creating 3D models.

For example, a user may physically construct and sculpt a vase with Topobo. This model is interpreted (as 3-dimensional surface meshes) by a PC running 3D modeling software. Using a GUI, the PC is instructed to constrain the vase to a 10 gallon volume. If the user physically pushes in one side of the vase, the PC will extend other sides of the vase to maintain the volume. In this way, Topobo augments the familiar process of sculpting by providing computational feedback through manipulation of the form being created. Such a system may be of use to professionals working to understand and/or create physical, dynamic forms. Several examples are architects, landscape architects, sculptors, geneticists and bioengineers working to understand complex protein models.

The present invention may advantageously take the form of a trainable modular robot comprising one or more active modules and one or more passive modules. Both kinds of modules consist of a body member and one or more fixed fasteners that rigidly attach the body member to the body member of one or more other modules to form a rigid articulated structure. The fixed fasteners are positioned on the passive modules such that the assembled rigid structure has a cubic or tetrahedral crystal geometry. To achieve this, the passive modules which are selected to build a given structure are obtained from an available collection of different module shapes, including straight, T-shaped. L-shaped or a tetrahedral elbow shape bent which connects adjoining modules at an angle of 108 degrees. Each passive module further includes a fixed fastener centrally located on its body member for rigidly attaching the module to another module that extends outwardly from middle of the body member. Each of the shaped passive modules is available in two different sizes proportioned in the scale ratio of 2 to 3 based on the Fibonacci relationship.

Each active module included in a rigid structure further includes a movable fastener for movably attaching its body member to a further module that is not included in the rigid articulated structure to thereby form a combined structure that can be manually reshaped. In addition, each active module includes a position sensor for acquiring and storing position data specifying a sequence of positions assumed by the movably attached module as the combined structure is manually reshaped, and a controllable drive motor coupled to the movable fastener for moving the further module relative to the rigid articulated structure in accordance with the previously stored position data. Each active module further includes a peer-to-peer communications interface for exchanging commands with other active modules, including one or more commands establishing a recording time interval during which position sensors acquire and store said position data, and one or more further commands establishing a playback interval during which the controllable drive motor in each active module moves an attached movable module in accordance said position data captured by that module or received from another module.

The invention may be implemented as a construction set comprising components that can be connected together by fixed and movable joints to form an articulated assembly that moves. Each of the fixed joints includes a fastener for attaching two components together to form a rigid structure, and the following functional parts are associated with each movable joint: a position sensor, CPU and memory for detecting and storing sequential position data that specifies the relative movement of the two components connected by the movable joint during a recording interval, a controllable drive motor for moving the two attached components relative to one another during a playback interval subsequent to the recording interval to replicate the relative movement of the two attached components specified by the stored sequential position data, a manually adjustable control for modifying the operation of the controllable drive to vary the motion of said two components during the playback interval, and a peer-to-peer communications interface for exchanging command signals and sequential position data with other movable joints in said construction set.

The manually adjustable control may take the form of a "backpack" module than can be physically attached to and control the motion produced by an active module. The manually adjustable control may vary the amplitude of the relative movement of one or more drive motors, can vary the speed of the drive motors, or vary the timing of the playback interval of the motor which drives one movable joint relative to the playback interval of other movable joints in said construction set.

Data and commands sent via the communications interface associated with each movable joint may be used to transmit a start recording command to other movable joints to initiate said recording interval for a plurality of several movable joints at substantially the same time. Similarly, playback commands may be sent from one movable joint to another so that different joints move at the same time, or move in similar ways with a phase delay between joints. The communications interface may be used to transmit sequential position data command recorded at one movable joint during the recording interval to other movable joints so that a plurality of movable joints are conditioned to move in similar ways, either at the same time or at different times, at the same speed or at different speeds, or with the same amplitude of travel or with different amplitudes.

These and other features and advantages of the present invention may be more clearly understood by considering the following detailed description of a specific embodiment of the invention. In the course of this description, frequent reference will be made to the attached drawings.

BRIEF DESCRIPTION OF THE DRAWINGS

FIGS. 1-9 are isometric views of the nine different passive components used to construct rigid structures in accordance with the invention;

FIGS. 22-26 illustrate the manner in which four active components are interconnected with passive components, with one of the active components operating as a Queen which sends motion commands to the other three active components which mimic the Queen's motion;

FIGS. 29 and 30 are schematic diagrams depicting the interconnected components used to implement an active component.

DETAILED DESCRIPTION

The Topobo system is comprised of 6 different primitives that are connected with small pin shaped connectors. Five of these primitives are called "Passive" because they form static connections. One "Active" primitive is built with a motor and may include an auxiliary control device called a "Backpack. These motorized Active components are the only ones that move, so the system is able to faithfully record and replay every dynamic manipulation to a structure.

Passives

Figure 12:
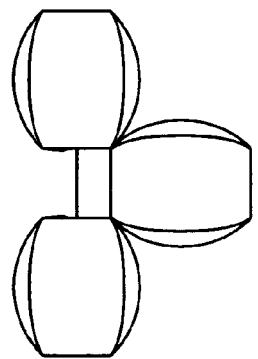
FIGS. 10-18 are elevational views of the nine different passive components.
Figure 13:
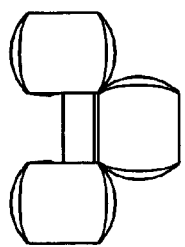
Figure 10:
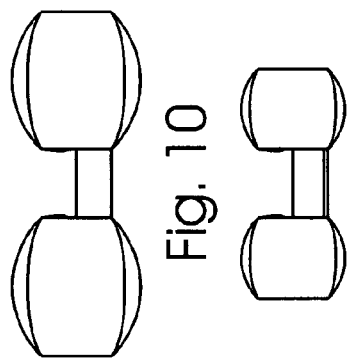
Figure 11:
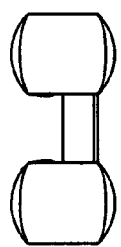
Figure 16:
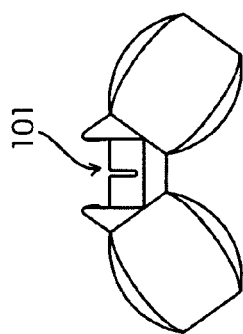
Figure 17:
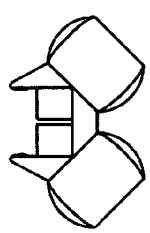
Figure 14:
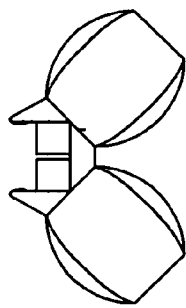
Figure 15:
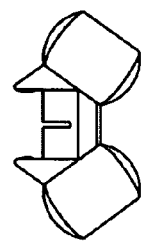
Figure 18:
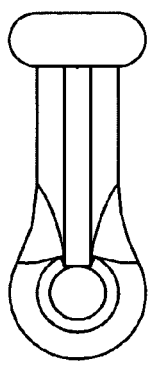

The Passives are designed to allow a variety of physical structures to be built. Since Topobo is intended to model various natural forms like anthropomorphic skeletons and regular geometrical meshes, a system that allows branching and spatial looping was required. The Topobo geometry is based on cubic and tetrahedral crystalline geometries. The Passives are shown in the isometric views, FIGS. 1-9, in the side elevation views, FIGS. 10-18. The Passives have five different shapes, four of which exist in two sizes:

(1) a large size "straight" part seen in FIGS. 1 and 10 and a small size "straight" part seen in FIGS. 2 and 11;

(2) a large size "T-shaped" part seen in FIGS. 3 and 12 and a small sized "T-shaped" part seen in FIGS. 4 and 13;

(3) a large size "L-shaped" (90 degree) part seen in FIGS. 5 and 14 and a small size "L-shaped" (90 deg) part seen in FIGS. 6 and 15;

(4) a large size "tetra" (108 degree) part seen in FIGS. 7 and 16 and a small sized "tetra" (108 deg) part seen in FIGS. 8 and 17; and (5) an "Elbow" (offset 90 degree) part seen in FIGS. 9 and 18.

These first four shaped components listed above are built in two different sizes with a scale ratio 2:3 based on the Fibonacci relationship that describes scaling in growing systems like mammalian skeletons. The straight, T, L, and tetra components have a hermaphroditic notch in the middle as illustrated at 101 for the large tetra part seen in FIGS. 7 and 16. Thus centrally located attachment point allows any two pieces to connect and branch at a right angle. For example, two straight pieces will form a "+" shape, or two tetras will form a tetrahedron. This arrangement allows the formation of regular meshes like a silicon tetrahedral lattice or simple forms like a pentagon or square. This regularity is readily understood because, when a user tries to build large, interconnected forms, pieces often fit together naturally.

Actives

Figure 19:
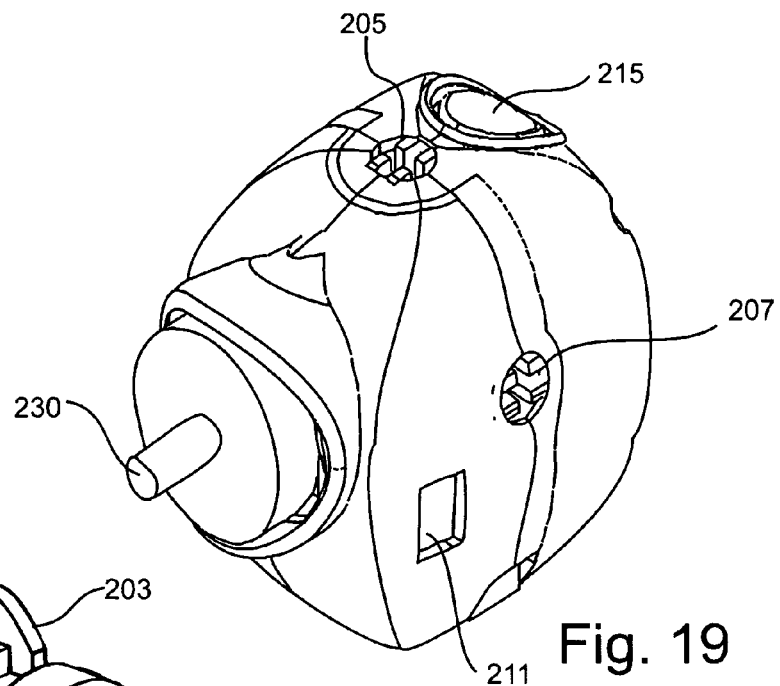
FIGS. 19 and 20 respectively are isometric and elevational views of an active component used to form a motorized movable joint in a structure.
Figure 21:
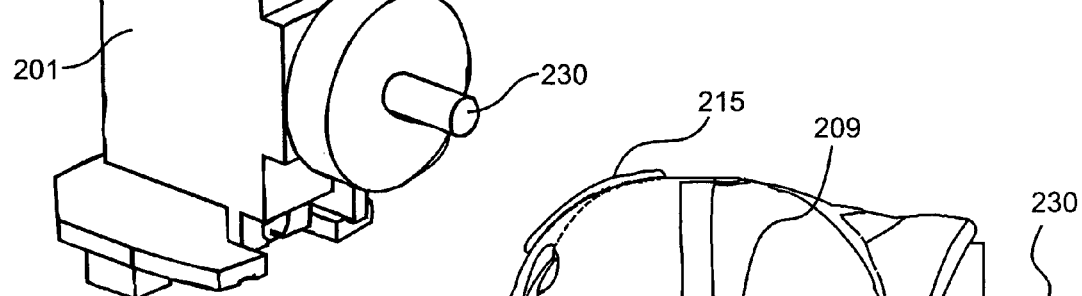
FIG. 21 is an isometric view illustrating the servomotor and electronics mounting board housed within each active component.
Figure 20:
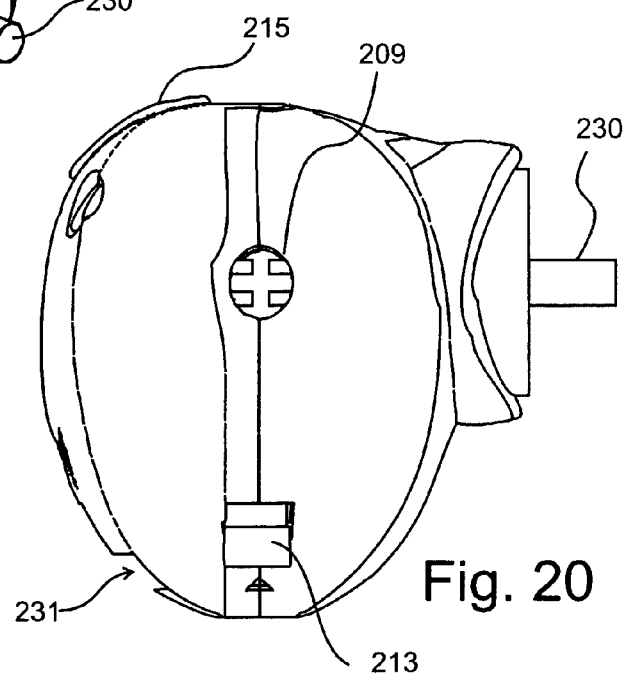
Figure 27:
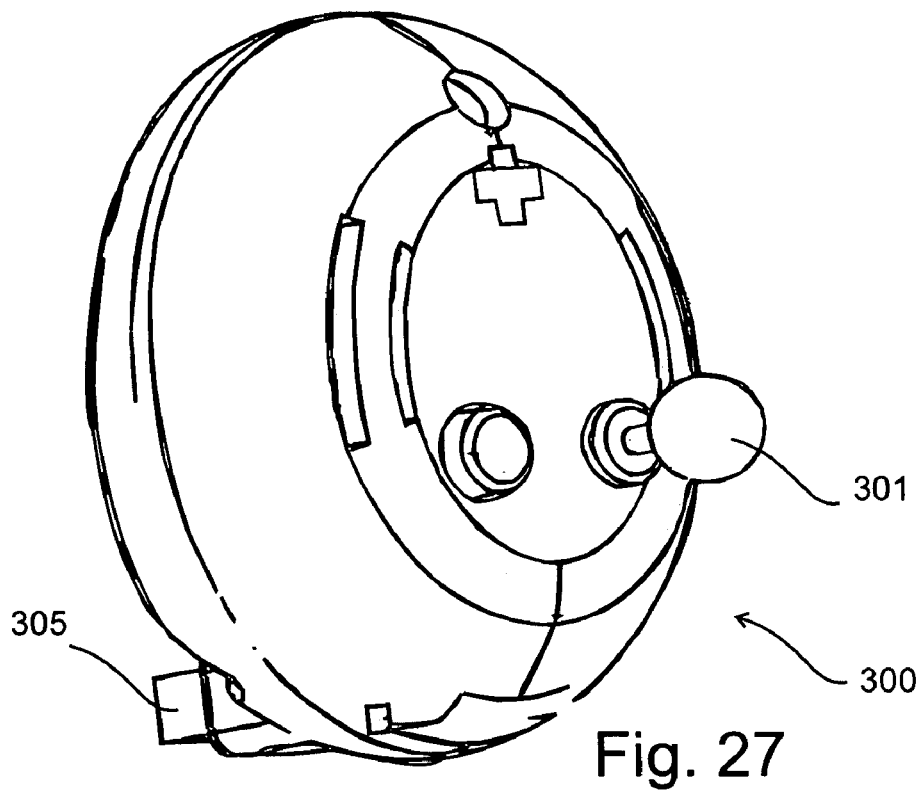
FIGS. 27 and 28 respectively are isometric and elevational views of a backpack component which attaches to and controls a motorized movable joint in a structure.
Figure 28:
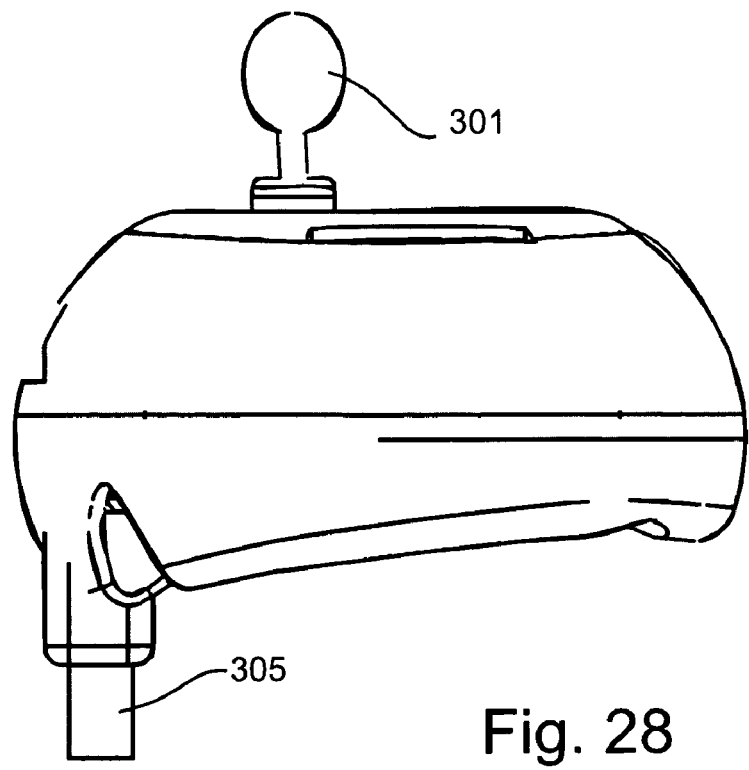

The exterior of an Active is shown in the isometric view of FIG. 19 and the side elevational view of FIG. 21. The principal components housed within an Active are shown in FIG. 21. The Active is made of a servo motor seen at 201 in FIG. 21 and electronics mounted on a circuit board 203, both of which are placed within a plastic housing seen in FIGS. 19 and 20. The housing has 6 points of mechanical connection, two of which are seen at 205 and 207 in FIG. 19 and another at 209 in FIG. 20. Three sockets are provided to connect power/communication cables, two of which are seen at 211 and 213, and a button 215 is backlit by a red/green LED (not shown). One of the mechanical connectors is connected to the output shaft 230 of the servo motor 201 and rotates 170°. A socket opening seen at 231 accepts the male plug of a "Backpack" unit as described below in connection with FIGS. 27-28. On board custom electronics handle power distribution, memory and processing, and peer-to-peer, multichannel serial communications. Each Active is identical and autonomous, and only needs power to function, which is provided via one of the sockets.

In a structure with many Actives, the system treats each button 215 identically. A user can start a recording with any button, and stop the recording with any button.

Topobo's distributed design allows it to be a "high level" interface for thinking about kinematic systems because it lets the user focus on the global behavior of their creation. When a button is pressed, all of the Actives synchronously record their local motions. If a child makes a circular ring of Actives and teaches it to roll across the floor like a tank tread, he only needs to understand and program the overall deformations of the ring. The Topobo system automatically decomposes the global motion into local motions.

Centralized Control

In recording mode, a user will grasp and wiggle an individual Active component and a component attached to the servo shaft in a creation. In playback mode, that same Active component will mimic the motion that was made to it. The other Actives in the structure have no motion to mimic. In some situations, it may be desirable for all Actives in a structure to mimic the motions made to one individual Active in the structure. To accommodate this complexity, we introduced the Queen, and Active which records the motion of its servo shaft during a recording interval, and then transmits the resulting motion data to other actives which mimic the Queen's motion. In both recording and playback modes, all motions of the Queen are imparted directly to all Actives connected to the Queen.

For example, suppose that one constructs a linear structure of actives with a Queen at one end. For example, as shown in FIG. 22, a Queen active 250 may be connected to a "slave" active 260 by attaching an elbow passive 257 to the motor shaft 259 of the Queen 250, and connecting a straight passive 261 between the elbow passive 257 and the slave active 253.. When the Queen 250 is recording, all of the other Actives 260, 270 and 280 will mimic its angular position. Thus, increasing rotations of the motor shaft 259 of the Queen 250 by 5 degrees, 10 degrees, and 15 degrees will cause the entire structure to begin to curl as shown respectively in FIGS. 23, 24 and 25. Eventually, the ends will touch as seen in FIG. 26.

Topobo Queens can be used to provide tangible examples of spatial translation. For example, two facing Actives that have identical motions will appear to have mirrored motions if their output shafts are facing each other. This can be used to construct scissor-like motions in a walking animal.

A Queen does not need to be mechanically attached to the creation it is programming, so it can also be used as a remote controller. Remote programming with a Queen gives a child synchronous input and output feedback during programming, allowing the child to observe their creation's motion while they are composing it.

Other Queens take advantage of Topobo's peer-to-peer network architecture. The Actives can easily increment a variable each time a message is passed, so a Queen's motion can change based on distance from the Queen. The following functions are identical in behavior to the "peer to peer backpack." The difference is that they are executed with special software on the Queen, rather than by attaching a separate component to an Active.

A Decay Queen causes the Queen's motion to be incrementally scaled smaller as it is passed from the source. A linear string of Actives can gradually curl into a spiral.

A Time Delay Queen aggregates a time offset before playback of the Queen's motion. A linear string of Actives can move with wave-like motions.

A Faster/Slower Queen increments a change in period as a motion is passed. Due to Topobo's looping playback, a linear string of parts can exhibit harmonic interference patterns.

Motion Editing

If a child creates a motion in a creation and wants to change that motion, she must stop playback and then rerecord the entire motion. To provide a means to edit motions, we have introduced an editing feature to Active functionality and a series of "physical functions" called Backpacks.

The simplest way to edit playback motions is to rewrite a portion of the playback motion. Normally, if a child presses and releases a button on an Active (seen at 215 in FIG. 19) during playback, the entire creation will stop moving. However, if the child presses and holds down an Active's button during playback, the active will rewrite its memory and re-record the new positions of the Active until the button is released. The child may thus depress a button on an individual Active and move that Active to re-record a motion segment over the original recording. After the button is released, the Active will return to playback, displaying the resulting combination of the original recording and the re-recorded motion.

This scheme introduces a complexity: normally, all Actives record and play back at the same time, resulting in all Actives displaying synchronized loops during playback. However, what happens if a child has rewritten a motion that lasts longer than the original recording? In this case, the resulting playback motion could be longer than the playback motion of the other Actives in the creation. Loop lengths, and motions will no longer remain synchronized. The alternative—enforcing lengths to remain shorter than the original recording—seemed to be an overly strict rule, so in the current implementation users can create a secondary recording that is longer, and gets out of phase, with the original loop.

Physical Functions: A Backpack

Backpacks—physical parts with a button and a knob—can be snapped onto an Active to augment the Phase, Amplitude, and Frequency of playback motions. The different Backpack functions are described using familiar words, where Phase is called "Time Delay," Frequency is called "Faster/Slower" and Amplitude is called "Bigger/Smaller." Each function can be used in three different ways called "local," "global," and "peer-to-peer," affecting the playback motions in strikingly different ways.

A Backpack provides control electronics that may be connected to control the operation of an Active. The plastic housing of each Backpack, seen generally at 300 in FIGS. 27 and 28, includes a control knob seen at 301 and the combination of a control button and a LED display seen at 303. A male electrical connector shown at 305 inserts into a female socket within the opening in the housing of an Active (seen at 231 in FIG. 20) to mechanically secure the Backpack to the Active which it controls, and to provide electrical connections between the electronics of the two units.

Local Backpack

The local Backpacks allow local editing of playback motions. By default, if a Backpack is attached to an Active, during playback it will change the playback motion. For example a "faster/slower Backpack" will make the playback motion of an Active faster or slower, depending on where the Backpack's knob 301 is turned. This might be used to make a dog's tail wag faster as it walks around. Frequency is visualized with a pulsing LED on the Backpack whose frequency changes depending on the setting of the Backpack's knob. The affected Active also pulses its LED in sync with the Backpack's LED.

The Time Delay (phase) Backpack changes the moment at which an Active will start its loop relative to the other Actives in a creation. For instance, imagine a dog that is initially programmed to wag its tail and then shake its head. A child might attach a phase Backpack to its tail and turn the knob on the Backpack to make the tail wag in sync with the head's shaking. Phase Backpacks can also be used to finely tune the relative motions in an animal's body, to make the animal walk more effectively. Relative phase is visually expressed with a simple LED pulse: at the beginning of each loop, the LED momentarily changes from green to orange. Normally, all Actives begin their loops at the same time and flash orange in sync. If a time delay Backpack is employed, the user will see the orange flash at a different time.

The bigger/smaller (amplitude) Backpack scales the recorded motion of an Active larger or smaller. Motions are scaled relative to the start position of the recording and, since Actives rotate only 170°, amplified motions can get "clipped" during playback.

Global Backpack

Backpacks are outfitted with the button seen at 303 that allows them to toggle through states. The default state is Local Backpack. Pressing the button 303 will toggle to the secondary state, "Global Backpack." Global Backpack identically affects all Actives in a creation with the Backpack's setting. For instance, the Frequency Backpack will cause all Actives in the creation to move faster or slower. In Global mode, all Actives will pulse their LEDs to reflect the changed speed of their playback motions, and turning the knob on the Backpack will cause the motions, and LED pulses to speed up or slow down. Similarly, Amplitude Backpack will scale the motions of all Actives in a creation. Since phase shift is a temporally relative function, the phase Backpack does not have a Global function.

Peer to Peer Backpack

If a Backpack is attached to a normal Queen, it behaves as a Peer to Peer Backpack. The relative amplitude, frequency or phase shift of peer to peer functions is based upon the network topology, where the change becomes more pronounced every time the message is passed from the Queen. Topobo is designed with a peer to peer network, and the peer to peer Backpacks explore the behaviors of progressive mathematical series as expressed through motion. This enables dramatically different behaviors of structures of Actives, compared to the normal Queen.

A bigger/smaller Backpack transforms a normal Queen into a Decay Queen. A sequence of Actives connected to the Decay Queen is endowed with a knowledge of how many steps away from the Queen it is. An active will then scale the Queen's motion by a factor which is proportional to this number of steps. Using a Decay Queen, a linear string of Actives can gradually curl into a spiral.

Time delay Backpack transforms a Queen into a Time Delay Queen. Actives connected to the Time Delay Queen mimic the action of the Queen following a temporal delay that is proportional to the number of steps away from Queen that an Active is located. Using a Time Delay Queen, linear strings of Actives can move with wave-like motions. Users can turn the Backpack's knob during playback to experiment with the relationship between loop length and time delay.

Finally, the Faster/Slower Backpack causes a Queen to speed up or slow down Actives as a function of steps away from the Queen. Due to Topobo's looping playback, a linear string of parts can exhibit harmonic resonance patterns. The faster/slower Queen introduces an interesting complexity: during record, Queens normally cause all Actives to behave the same way they will during playback. However, Actives cannot play "faster" during record mode since this would require knowing the future. If a child turns the Backpack to "faster," he will only see LEDs on neighboring Actives flash faster during record while motions remain synchronous. Motions will speed up only upon transition to playback mode.

Backpack as Physically Programmed "Conditional"

During normal use, if the knob 301 on the backpack is turned during playback, the motion changes in real time. Backpack feedback works like this: the knob 301 may be outfitted with a connector (not shown) making it compatible with Topobo passives. A torsion spring forces the control know to return to a predefined position after it is turned. Thus, imagine the leg of a scorpion attached to the knob of a bigger/smaller Backpack that is modifying the motion of that leg. As the scorpion walks and shifts its weight onto that foot, changes in the scorpion's center of gravity place more weight on this foot, deflecting the Backpack and causing the foot to step more lightly. The scorpion might thus be designed to walk over irregular terrain and might be developed to step out of holes in the ground.

Backpack construction: The backpacks incorporate a single printed circuit board (not shown) two power/communications ports, a button and a potentiometer housed in a plastic case. Their engineering is similar to the Actives with a few notable exceptions. Backpacks have no servo, and thus require much less power. Thus, a Backpack is powered with a linear regulator instead of the more complex switching regulator used on the Actives. We also do not use a buffered line driver, and instead rely on the mechanical design of the USB connectors to protect I/O lines during hot swapping. Backpacks use the same PIC microcontroller as the Actives and implement the standard Topobo communications protocol, allowing them to process and rout messages through their two I/O ports. Unlike the Actives, one of the ports is a "male" plug seen at 305 in FIGS. 27-28 allowing the backpack to connect directly to an Active without the need for an additional cable.

Backpack Communications: When a backpack is attached to an Active, it will announce to that Active that it is present and pass its backpack identity and potentiometer value to that Active. It will then send an occasional (5 Hz) "I'm still here" message to the Active to denote that it is still attached. Any changes in the ADC, or any received messages will be passed to the Active at normal data rates. If an Active ceases to hear the Backpack's "I'm still here" message, the Active's internal "backpack timer" will timeout, and the Active assumes that the Backpack is no longer present.

State Changes: Some backpacks have a button that allows them to transition from a "local" to a "global" Backpack. The button press simply changes the internal state of the backpack, which then sends state and modifiers to the Active. All of the Actives are preprogrammed to handle all variations of Backpack message types.

Other Conditional Behaviors

Other physical feedback techniques can be used and understood without the need for a GUI environment. For example, an infrared detector may be used as an alternative to the Backpack's knob. The infrared detector would sense the presence of either nearby objects or other Topobo creations that emit a certain IR frequency, allowing a creation to change its behavior based either on environment or "social" interactions. While modifications such as phase, amplitude and frequency may seem simple and limited, they have more breadth than may be apparent. One such creation can change the direction it walks based on a single phase shift.

Network Button Debouncing

In some situations, two children will press two different buttons in the same creation (network) to cause that creation to change state once. For example, they may want to the entire creation to go from record to playback. However, the two button presses would normally be interpreted as two distinct button presses by the network, and the system would change state twice. In order to create the expected results, a new form of network button debouncing has been devised that is generally applicable in any physical system containing a plurality of switches. The switches are debounced at the network level. Whereas, using local button debouncing, when two or more button closures occur in rapid succession, only one is recognized. In our debouncing system, a network button debouncing algorithm is employed that ignores successive button presses if more than one button press anywhere in the network is encountered within a certain time threshold.

Technical Implementation

The Passives and the housing for the Actives are 3-dimension forms constructed using ABS plastic, an easily machined, tough, low cost rigid thermoplastic material with high impact strength. The Passives and Actives are mechanically interconnected using LEGO Technics® connectors. A TowerHobbies HS81-MG servo motor with 170° rotation because was chosen for its high strength to weight, robust metal gears, ease of back driving, and an included position sensor and drive circuitry. The servos' output shaft is outfitted with a custom clutch to protect the gears from excessive torque.

The Actives' on-board custom electronics mounted on the circuit board 203 seen in FIG. 21 handle power distribution, memory and processing, and multichannel serial communications. A 24V power bus is locally stepped down to 6V with a buck converter and then is dropped to 5V with linear regulator that powers the digital electronics. This minimizes the effects of power losses in the system, limits noise transfer between Actives and reduces current requirements.

A microcontroller chip is also mounted on the circuit board 203 and handles both local processing and network communications. The microcontroller may be a PIC18F252 microcontroller available from Microchip Technology Inc. and described in the PIC18FXX2 Datasheet (2002) and the PICmicro® 18C MCU Family Reference Manual (2000) available from the company. Source code listings for specific programs executable on the PIC18F252 for implementing the preferred embodiment are provided in the accompanying Program Listing Appendix. This programming performs a one-time calibration sequence that measures the range of motion of the servo and correlates input and output position data. During record, the microcontroller reads the servo's internal potentiometer at 20 Hz using a built in 10 bit ADC and writes scaled 8 bit values to local memory. This provides about 30 seconds of record data at ¾° output resolution, which is accurate compared to the backlash in the servo's 4 stage gearbox. A custom peer-to-peer serial networking protocol transfers data between Actives at 9600 BPS. Specialized line drivers allow hot-swapping power/communications connections between Actives.

Motor Control: The servo is driven by sending a 40 Hz TTL signal whose peak is 1-2 ms long. Varying pulse widths correspond to absolute output positions measured from a potentiometer that is connected to the output shaft of the servo. Our microcontroller creates servo pulses using two timers that change the duty cycle of the pulse based on 8 bit position values. No two servos are the same, so a valid range of pulse widths is established for each Active during a calibration sequence that is performed at time of manufacture.

Motor and Sensor Calibration: The calibration algorithm correlates input potentiometer readings from the servo to corresponding output pulse signals. The mechanical range of the servo is smaller than the electrical range of the potentiometer, so we do not use the full range of the ADC. The calibration scheme first determines the absolute minimum and maximum potentiometer readings for the servo by overdriving the servo to the left and right mechanical stops while reading the ADC. A series of measured pulses then gradually drives the servo to the left and right stops while the ADC is concurrently read. When the ADC value matches the previously recorded minimum or maximum value, a minimum or maximum pulse width is recorded for the servo. These maximum and minimum pulse and ADC values are stored in EEPROM and all subsequent pulse widths are created along a linear scale between the minimum and maximum pulses. Similarly, all subsequent 10 bit ADC reads are linearly scaled to an 8 bit value between 0-254 before being stored in memory.

The calibration scheme is convenient for a number of reasons. It allows us to use the full range of the mechanical motion of each Active, get full resolution out of 8 bit storage registers in a data array used for position recording, and standardizes all positions readings across Actives. For instance, it is due to this standardization that the Queen is able to easily communicate a "copy" command despite significant inconsistencies among Actives' hardware.

Wiring

Figure 30:
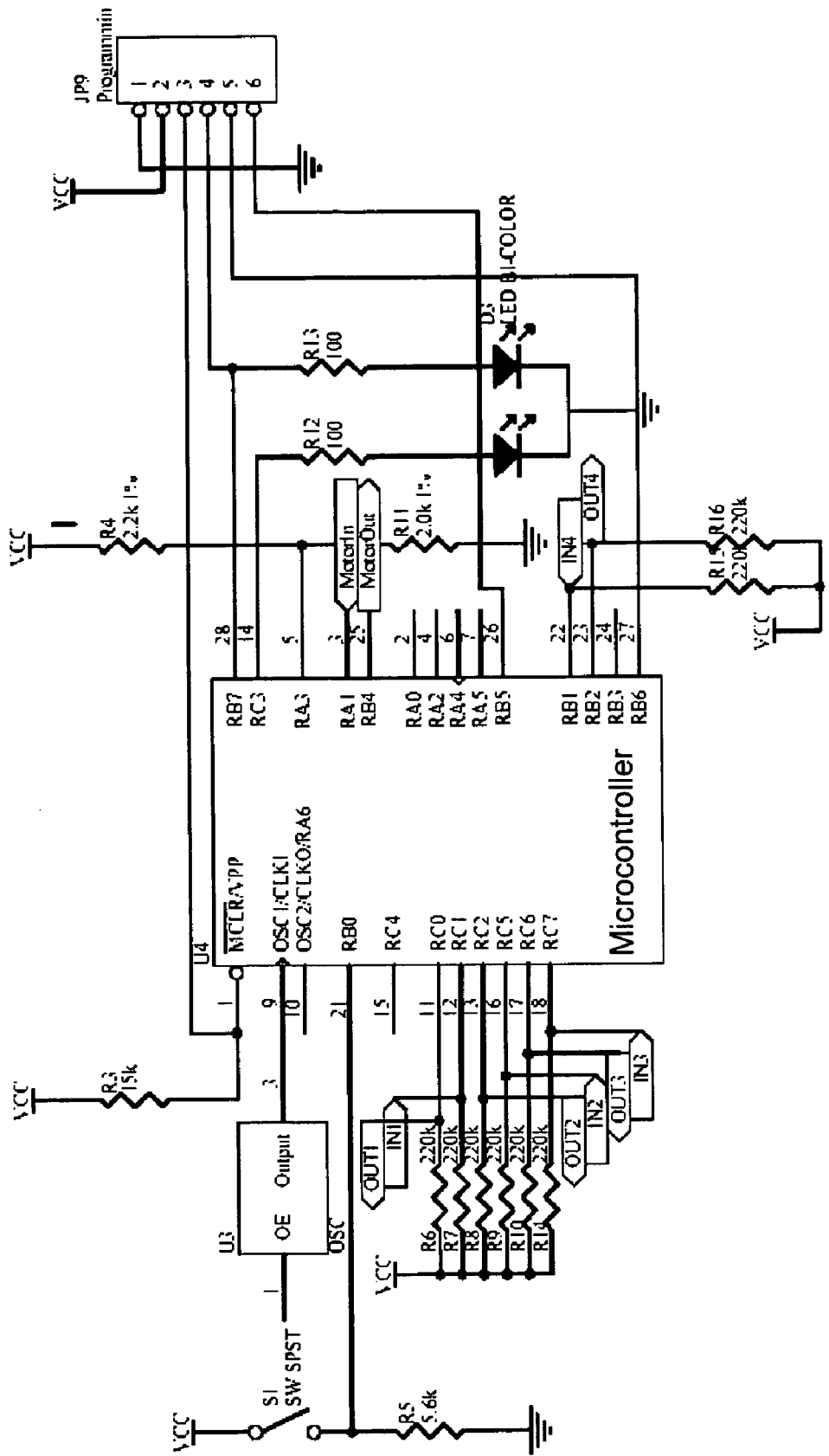

The interconnections between the microcontroller and the other components are shown by the schematic wiring diagrams seen in FIGS. 29 and 30, with FIG. 30 showing the microcontroller chip, the pushbutton switch (labeled S1 in FIG. 30, and the two colored LED display D3). FIG. 29 shows how the Active is powered from an external power supply seen at the left, and how the microcontroller is connected to the motor through the motor connection jack at the top.

In the Topobo system as described, Actives are interconnected using USB cables which carry power, data and command signals. External wiring may be eliminated by integrating the electrical and mechanical connectors in order to distribute power and communications channels. The passives components would need to rout power and communications lines. Alternatively, a wireless communications network may be used. In practice, interconnecting Actives using cables has an advantage: when using the peer to peer Backpack, it is easy to visualize and reconfigure the network topology.

Record and Playback: During normal local recording, an Active will read its ADC at about 36 Hz and write values to a 1 Kb data array. When playback is initiated (or when the array is full) the data is copied to nonvolatile flash memory and is then passed as an argument to the playback function, which simply uses the calibration results and recorded position data to recreate a series of servo pulses at 36 Hz. This gives us a maximum of about 34 seconds of recording time. One improvement to this scheme is to record at half the rate and linearly interpolate values during playback using a simple average. This approach has been proven to work and gives the user over a minute of recording time. By writing to flash memory, programs can be recalled if an Active is temporarily unplugged. Communications Peer to peer communications are handled exclusively in software, giving us 4 channels of serial communications with data rates at around 57000 bits per second. The networking protocol uses two wires for communication, generally used as "clock" and "data" that are by default pulled to Vcc with 220K pullup resistors. In the program's main loop, an Active will routinely poll for messages on all channels. If an Active wants to send a message, it will pull the clock line low and wait for the data line to be pulled low by the neighbor. If no neighbor is present, the channel will timeout and the Active will check the next channel. If the handshaking is returned (the receiver pulls the data line low), the sender will begin clocking data at a predefined rate. Bytes are transmitted with a parity bit and arrive in 1-5 byte packets handled by a software data buffer. An error in parity will cause the receiver to request the bad bytes be resent. An Active can only send or receive on one channel at one time, as we have no hardware buffers. Messages arrive with a message type (denoting a type of state change, for instance) an argument, and a message ID. Message ID's are used to prevent propagation of a message in a network loop: if the same message type and ID is received twice, the message is killed.

Message Types: The most common messages transmitted over the communications interface between Actives are state changes telling an Active to record, playback, or stop, and synchronization signals. Other message types are Backpack messages and Queen messages that include a position signal that describe a position the downstream Active is to assume, or recorded motion data describing a sequence of such positions. When a message is received correctly, it is immediately sent to all communications channels except the channel the message was received on. Note that an Active may serve as a branching node, receiving an input message on port and transmitting it to a plurality of other Actives connected to other ports. After a message has been propagated, it is processed.

Synchronization: One problem with an asynchronous system such as Topobo is that sometimes Actives record messages of slightly different lengths, causing them to eventually get out of phase during their looping playback. To keep Actives synchronized during playback, they all communicate their loop start to their neighbors. If an Active receives a loop start signal and its own array pointer is near its loop start, the Active's array pointer will jump to its loop start. This is similar to the way symphony musicians stay in rhythm by subtly listening to the cadence of their neighbors. By hearing a signal from one's neighbors, slight errors in timing can be corrected.

Topobo System Design

In this section, a number of design principles that informed the creation of the specific embodiment of the Topobo system are identified. A discussion of the system's interaction design will include a qualitative description of the system's components, functionalities, and some envisioned uses. By describing how we envision the system to be used by children of varying developmental levels, we hope to convey a sense of the domains of knowledge Topobo is intended to make accessible to children.

Design Principles

Topobo was designed to retain the best qualities of existing manipulative materials while giving the material a new identity—an identity that can both reveal new patterns and processes to children, and that allows children to creatively express patterns and processes that can not be expressed with existing materials. To achieve this goal, we established 6 design principles:

Be accessible, yet sophisticated—be ergonomic and intuitive for very young children, but support growth across multiple cognitive levels and into adulthood.

Be robust—have a design that would not break or malfunction so that children don't fear making "mistakes."

Be meaningful even if the power is turned off—technology should add to a toy, without sacrificing the good qualities inherent to its class of toys.

Be expressive—encourage exploration of a topic without prescribing "right" and "wrong" activities.

Engage multiple senses—engage sight, sound, and touch to provide rich, memorable interactions.

Be scalable—In the spirit of a modular system, every individual component should be physically and computationally complete and extensible.

Topobo is comprised of 10 different primitives that are connected with LEGO® Technics® connectors. Nine of these primitives (shown in FIGS. 1-18) are called "Passive" because they form static connections. One "Active" primitive (shown in FIGS. 19-22) is built with a motor and electronics. The motorized components are the only ones that move, so the system is able to faithfully record and replay every dynamic manipulation to a structure. Passives We designed nine different Passives to allow a variety of physical structures to be built. Since Topobo is intended to model various natural forms like skeletons and interlacing meshes, the system allows branching and spatial looping. The Topobo geometry is based on cubic and tetrahedral crystals.

The "elbow" (offset 90°) seen in FIGS. 9 and 18 comes in one size. The remaining "straight," "T.," "L" (90°), and "tetra" (108°) shapes come in two sizes with a scale ratio 2:3, based on the Fibonacci ratio that describes scaling in growing systems like mammalian skeletons. These latter 8 pieces are bisected by hermaphroditic notches (e.g. the notch 101 seen in FIG. 7), allowing any two pieces to connect and branch at a right angle. For example, two straight pieces will form a "+" shape, or two tetras will form a tetrahedron. This arrangement allows the formation of regular meshes like a silicon tetrahedral lattice or simple forms like a pentagon or square. Children notice this regularity quickly because when a child tries to build large, interconnected forms, pieces often fit together.

The passives are also designed to be aesthetically consistent with the system's goals; they should be individually beautiful and assemble to create unified-looking creations.

By basing the segmentation of the passives on Brancusi's Endless Column, they are intended to appear somewhat organic and regular, and their square cross section is intended to imply the possible 90? orientations of their connections.

Similarly, the color of the parts is intended to help people distinguish the different shapes—the parts are color coded by shape—and to lend themselves to playful, unified looking creations. We developed a palette of cool colors (blues and greens) with one accent color to give characters a visual "pop." These colors are all tonally consistent so that none is much brighter or darker than another. We assigned the accent color (orange-red) to the 90 degree components because these parts often are most often used to terminate limbs on animals, giving the animal a tonally consistent body with accented feet, ears, or tails. The goal was to avoid "polka dot" creations while keeping the creations visually playful. Actives The Actives are motorized, networkable, egg-shaped plastic objects with a button and an LED for indicating whether the system is in record (red) or playback (green) mode. To record a movement, the user presses a button (seen at 215) on an Active, twists and moves the Active to program a sequence of behaviors, and then presses the button 215 again. The Active immediately goes into playback mode, which repeatedly replays the user's input until the button is pressed a third time, which makes the active stop moving. Double-clicking the button will recall the last recorded motion.

In a creation with many Actives, all of the Actives will record and playback at the same time. For example, if a child makes a circular ring of Actives, pressing a button on one of the Actives then sets all of the Actives in the structure to be in recording mode. The child may then move the circular structure of actives in the manner of a tank tread rolling across the floor, and then press any one of the Actives' buttons to set the structure into playback mode. At that moment, the motion that each of the Actives remembers is their local motion, despite the fact that the child has manipulated the global structure. In playback mode, the Actives mimic their local behaviors inspiring the whole system to take on the global motion imparted to it by the child.

The Active is made of a servo motor and electronics in a plastic housing. The housing has 6 points of mechanical connection, three sockets to connect power/communication cables and a button that is backlit by a red-green LED. One of the mechanical connectors is connected to the output shaft of the servo motor and rotates 170°. On board custom electronics handle power distribution, memory and processing, and peer-to-peer, multichannel serial communications. Each Active is identical and autonomous, and only needs power to function.

During normal use, if the knob on the backpack is turned during playback, the motion changes in real time. Backpack feedback works like this: the knob is outfitted with a LEGO connector making it compatible with Topobo passives and is affixed with a torsion spring that forces it to return to a predefined position after it is turned. Thus, imagine the leg of a scorpion attached to the knob of a bigger/smaller Backpack that is modifying the motion of that leg. As the scorpion walks and shifts its weight onto that foot, changes in the scorpion's center of gravity place more weight on this foot, deflecting the Backpack and causing the foot to step more lightly. The scorpion might thus be designed to walk over irregular terrain.

It is to be understood that the methods and apparatus which have been described above are merely illustrative applications of the principles of the invention. Numerous modifications may be made by those skilled in the art without departing from the true spirit and scope of the invention.

What is claimed is:

1. A trainable modular robot comprising:
   one or more active modules and one or more passive modules, each of said active and each of said passive modules consisting of a body member and one or more fixed fasteners for rigidly attaching said body member to the body member of one or more other modules to form a rigid articulated structure,
   each of said passive modules used to form said rigid articulated structure being selected from a collection of passive modules of different shapes including straight, T-shaped, L-shaped or shaped with at least one 108 degree bend such that said rigid articulated structure has a cubic or hexagonal crystalline geometry,
   each of said active modules further comprising, in combination,
   a movable fastener for movably attaching said body member to a further module not included in said rigid articulated structure to form a combined structure that can be manually reshaped,
   a position sensor for acquiring and storing position data specifying a sequence of positions assumed by said further module as said combined structure is manually reshaped, and
   a controllable drive motor coupled to said movable fastener for moving said further module relative to said rigid articulated structure in accordance with said stored position data.

2. A trainable modular robot as set forth in claim 1 wherein said fixed fasteners are positioned on each of said the body members such that said rigid articulated structure conforms to a cubic or tetrahedral crystal geometry.

3. A trainable modular robot as set forth in claim 1 wherein said each of said differently shaped passive modules in said selection exists in two different sizes.

4. A trainable modular robot as set forth in claim 3 wherein said two different sizes are proportioned in the scale ratio of 2 to 3 based on the Fibonacci relationship.

5. A trainable modular robot as set forth in claim 1 wherein each of said passive modules includes a fixed fastener located centrally on said body member for rigidly attaching said body member to another module that extends outwardly from said body member.

6. A trainable modular robot as set forth in claim 1 wherein said fixed fasteners are positioned on each of said the body members such that any two modules attached to a given module are aligned with one another at an angle of either 180, 108, or 90 degrees to form linear, heptagonal, or cubic structures respectively.

7. A trainable modular robot as set forth in claim 6 wherein said each of said differently shaped passive modules in said selection exists in two different sizes.

8. A trainable modular robot as set forth in claim 7 wherein said two different sizes are proportioned in the scale ratio of 2 to 3 based on the Fibonacci relationship.

9. A trainable modular robot as set forth in claim 8 wherein each of said passive modules includes a fixed fastener located centrally on said body member rigidly attaching said body member to another module that extends outwardly from said body member.

10. A trainable modular robot as set forth in claim 1 wherein each given one of said active module includes a peer-to-peer communications interface for accepting commands from another of said active modules, including one or more commands establishing a recording time interval during which the position sensor in said given one of said active modules acquires and stores said position data, and one or more further commands establishing a playback interval during which said controllable drive motor in said given one of said active modules moves said further module in accordance with said stored position data.

11. A construction set comprising components that can be connected together by fixed and movable joints to form an articulated assembly capable of movement,
- each of said fixed joints comprising fasteners for attaching two of said components together to form a rigid structure, and
- each of said movable joints comprising, in combination:
    - fasteners for movably attaching two of said components together,
    - a position sensor for detecting and storing sequential position data that specifies the relative movement of the two components connected by said movable joint during a recording interval,
    - a controllable drive for moving said two components relative to one another during a playback interval subsequent to said recording interval to replicate the said relative movement of said two components as specified by said stored sequential position data,
    - manually adjustable control means for modifying the operation of said controllable drive to vary the motion of said two components during said playback interval, and
    - a peer-to-peer communications interface for exchanging command signals and sequential position data with other movable joints in said construction set.

12. A construction set as set forth in claim 11 wherein said means for adjusting the operation of said controllable drive varies the amplitude of the relative movement of said two components.

13. A construction set as set forth in claim 11 wherein said means for adjusting the operation of said controllable drive varies the speed of the relative movement of said two components.

14. A construction set as set forth in claim 11 wherein said means for adjusting the operation of said controllable drive varies the timing of said playback interval relative to the playback interval of other movable joints in said construction set.

15. A construction set as set forth in claim 11 wherein one of said movable joints transmits a start recording command to other movable joints via said peer-to-peer communications interface to initiate said recording interval for a plurality of said movable joints at substantially the same time.

16. A construction set as set forth in claim 11 wherein one of said movable joints transmits a start playback command to other movable joints via said peer-to-peer communications interface to initiate said playback interval for a plurality of said movable joints at substantially the same time.

17. A construction set as set forth in claim 16 wherein one of said movable joints transmits a start recording command to other movable joints via said peer-to-peer communications interface to initiate said recording interval for a plurality of said movable joints at substantially the same time.

18. A construction set as set forth in claim 11 wherein one of said movable joints transmits sequential position data command to other movable joints via said peer-to-peer communications interface whereby a plurality of said movable joints are conditioned to move in similar ways.

19. A construction set as set forth in claim 18 wherein said plurality of said movable joints are conditioned to move in similar ways but at different times.

20. A construction set as set forth in claim 18 wherein said plurality of said movable joints are conditioned to move in similar ways but at different speeds.

21. A construction set as set forth in claim 18 wherein said plurality of said movable joints are conditioned to move in similar ways but by different amplitudes.

22. Apparatus capable of programmed movement comprising, in combination,
- a plurality of substantially rigid sections connected together by movable motor-driven joints to form an articulated structure that may be manually manipulated to assume different shapes,
- a position sensor for producing motion specification data indicative of the motion of a first of said joints during a motion recording interval, and
- means for controlling all of said joints in said articulated structure to move in accordance with said motion specification data to simulate said motion of said first of said joints for all of said joints.

23. Apparatus capable of programmed movement as set forth in claim 22 wherein said means for controlling all of said joints includes means for controlling said joints to move at different times.

24. Apparatus capable of programmed movement as set forth in claim 22 wherein said means for controlling all of said joints includes means for controlling said joints to move at different speeds.

25. Apparatus capable of programmed movement as set forth in claim 22 wherein said means for controlling all of said joints includes means for controlling said joints to move by different amounts.

26. Apparatus capable of programmed movement as set forth in claim 22 wherein at least some of said rigid sections consist of a plurality of parts connected together by fixed fasteners.

27. Apparatus capable of programmed movement as set forth in claim 26 wherein each of said parts is selected from an available collection of parts of different shapes, including straight, T-shaped, L-shaped or shaped with at least one 108 degree bend, for forming sections having cubic or tetrahedronal crystal structures.

* * * * *